3 Sheets--Sheet 2.
J. R. MAXWELL & E. COPE.
Improvement in Steam-Pumps.
No. 131,765.            Patented Oct. 1, 1872.
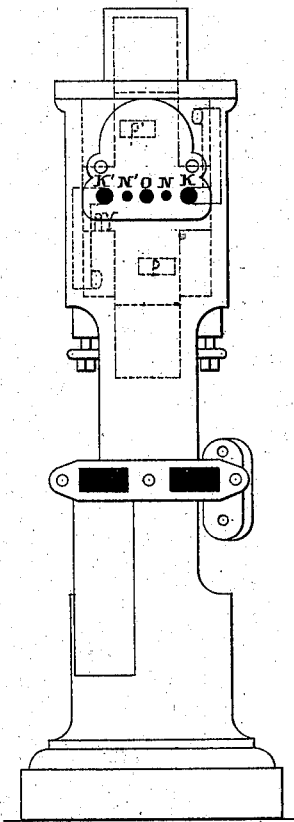
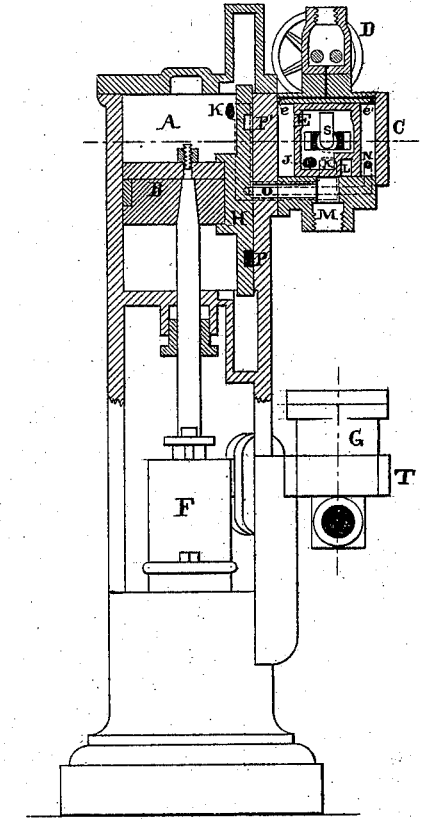
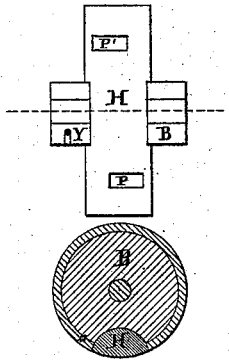
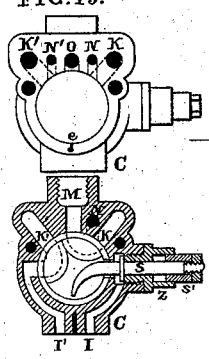
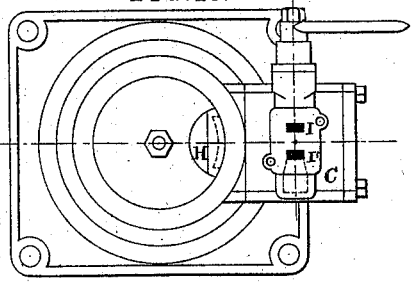
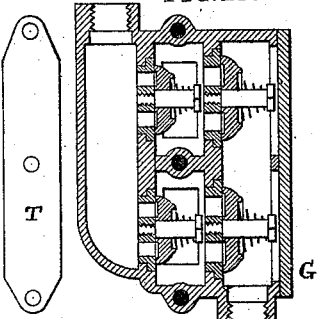
WITNESSES.            INVENTOR.
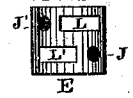
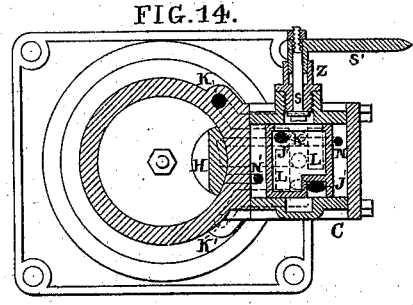

J. R. MAXWELL & E. COPE.
Improvement in Steam-Pumps.
No. 131,765.
3 Sheets--Sheet 1.
Patented Oct. 1, 1872.
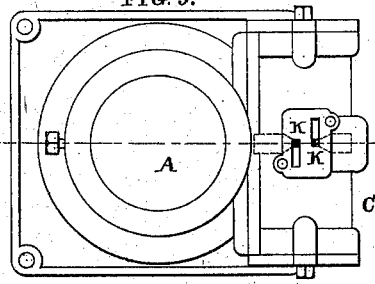
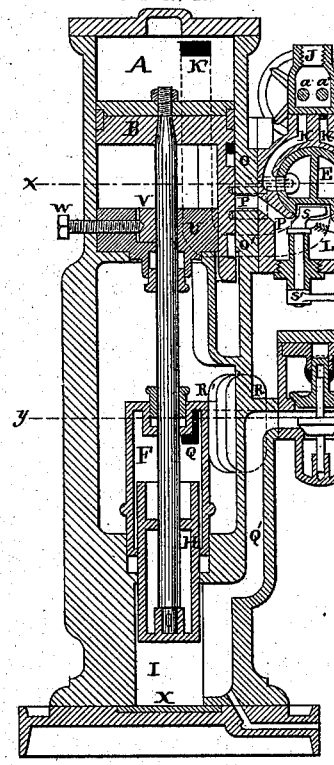
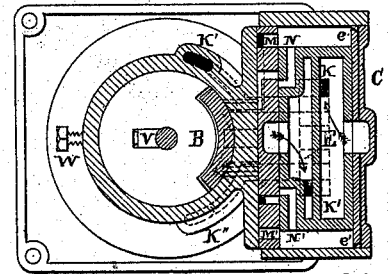
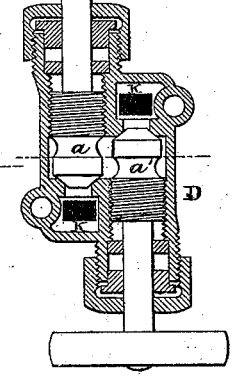
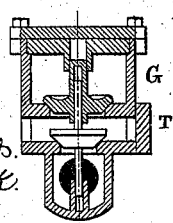
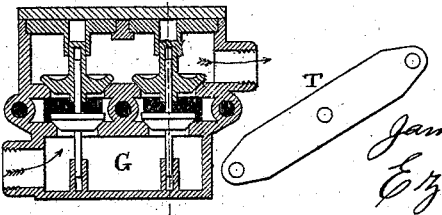
WITNESSES.
John C. Morris.
J. R. Paddack.
INVENTOR.
James R. Maxwell
Ezra Cope.

J. R. MAXWELL & E. COPE.
Improvement in Steam-Pumps.
No. 131,765. Patented Oct. 1, 1872.
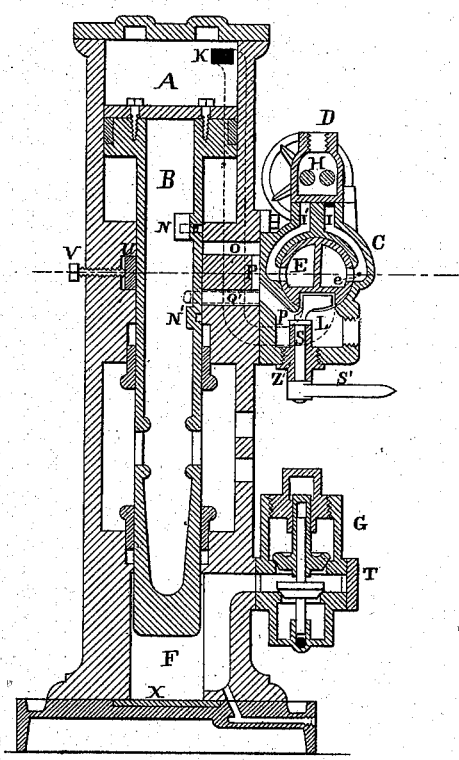
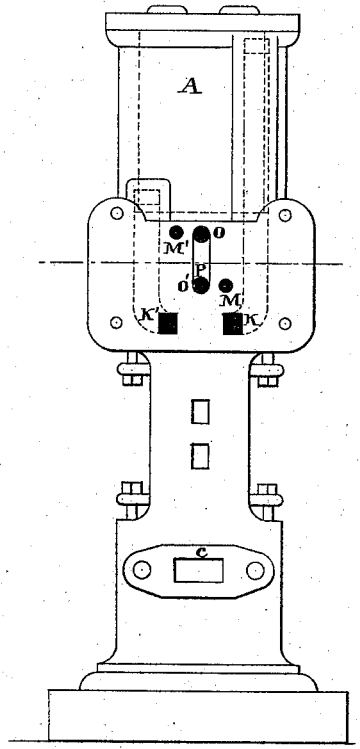
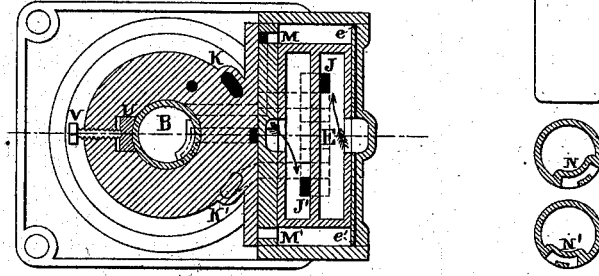
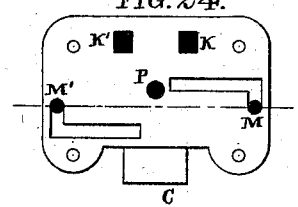
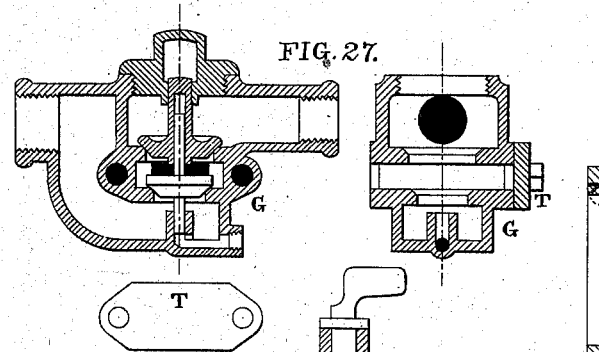
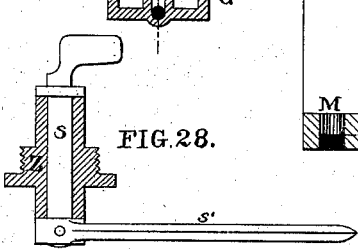
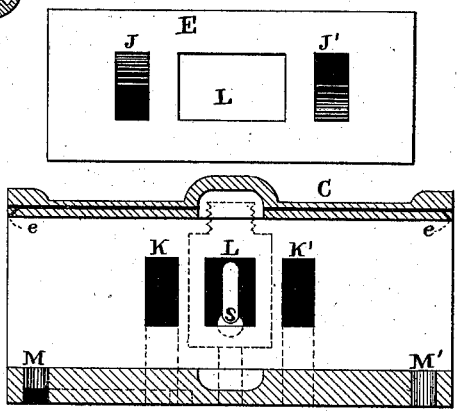
WITNESSES.
John C. Morris.
J. R. Paddack.
INVENTOR.
James R. Maxwell
Ezra Cope.

UNITED STATES PATENT OFFICE.

JAMES R. MAXWELL, OF CINCINNATI, OHIO, AND EZRA COPE, OF COVINGTON, KENTUCKY.

IMPROVEMENT IN STEAM-PUMPS.

Specification forming part of Letters Patent No. 131,765, dated October 1, 1872.

*To all whom it may concern:*

Be it known that I, JAMES R. MAXWELL, of Cincinnati, in the county of Hamilton and State of Ohio, and EZRA COPE, of Covington, in the county of Kenton and State of Kentucky, have invented certain Improvements in Steam-Pumps, of which the following is a specification:

This invention consists in the construction and arrangement of certain parts of a steam-pump, which will be more fully described in the following specification, reference being had to the accompanying drawing, in which—

Figure 1 is a vertical section of our steam-pump; Fig. 2 is an elevation of the same; Fig. 3 is a cross-section on $x\,x$; Fig. 4 is a cross-section on $y\,y$; Fig. 5 is a plan or top view; Figs. 6, 7, and 8 are detail views; Figs. 9, 10, and 11 are sectional detail views; Fig. 12 is a sectional elevation of a modification; Fig. 13 is a plan view, and Fig. 14 is a cross-section of same; Figs. 15, 16, 17, and 18 are detail views; Fig. 19 is an elevation of same; Fig. 20 is a section of the gum-valves; Fig. 21 is a vertical section of another modification; Fig. 22 is an elevation of same; and Figs. 23, 24, 25, 26, 27, and 28 are detail views.

Similar letters refer to similar parts in all the figures.

D in Fig. 9 represents a sectional view of the twin-throttle valve bisected in a plane passing through the axis of the two valve-stems $a$ and $a'$, which enter from opposite ends, extending their valve ends through and beyond a chamber common to both valves to reach their respective valve-seats. D exhibits a vertical section bisected transversely, showing a portion of a hand-wheel usual to each valve-stem that is screwed to its seat. J indicates the single inlet-orifice. K and K' indicate the exit-orifices. The joint surface, the bolt-holes for attaching the valve-body to corresponding seat-surface, the ajutages for the inlet-orifice and valve-stems, and the cavities for the chamber, ports, and passages are provided in the single casting, so as to be finished complete without other addition of parts than a cap and gland to each valve-stem.

When thus constructed and placed in proper relation to the whole structure, as is seen in the sectional view, Fig. 1, on seat seen in Fig. 5, it is operated to admit steam in different quantities to opposite ends of the steam-cylinder when different duty is required for the direct and reverse direction, or otherwise, as throttle-valves are ordinarily operated.

In Figs. 1, 9, 3, and 11, E represents the cylindrical valve, partitioned, as shown in Fig. 3, so as to divide the inlet-passages which lead to and terminate in the ports K and K' near the opposite ends. L is the exhaust-port, common to both of the passages, which, respectively, communicate with the main steam-passages K and K' of the main steam-cylinder A, as shown by the dotted lines in Fig. 3. These passages, respectively, end in a port near each end of the main steam-cylinder, so as to be covered by the main steam-piston before the completion of its stroke. A guide-recess is provided in the valve to receive one end of a valve-lever, S, shown in Figs. 28, 1, 2, and 21, and is shaped to permit actuation of the valve by means of the handle to change or start, and produce motion of all relating moving parts, for the purpose of warming up for starting, and more effectually voiding water of condensation through proper drains preparatory to starting and stopping, the end of the valve-lever serving as a guide to insure exact necessary position of the valve when at rest or being manipulated. The valve-lever is introduced into the valve-chamber through the exhaust-passage, and is secured in position by a screwed ferrule with one end fitted for the seating-collar formed on the lever. The end of the lever that works in the recess has its end-surface sector-shaped; the other end is provided with a convenient handle. The valve E is further provided at each end with an auxiliary passage, N and N', which are brought in relation with corresponding passages in the shell of the valve-chamber C. These passages pass through the seat on the main steam-cylinder A, on which the valve-chamber is attached and come in communication with the return-passages O and O' formed in the elongated segments of the main piston B, which segments operate as an auxiliary valve, the return-passages of which effect the exhaustion of the steam from the ends of the main valve by bringing the interior of the valve-chamber ends in connection with the main exhaust-passage P P' through the return-passages O and O' and the passages N, N, M, and M', as seen in Figs. 1, 3, 6, 7, 8, 25, and 11. On each side of the steam-passage in the valve-cylinder is formed a minute passage, e and e', whose office is to aid in starting the valve to shift by affording barely enough steam to make slight differential pressure greatest opposite to the end of the valve-chamber, the exhaustion preceding in the direction which the valve is forced. The passages described and shown are in sets, and their operation is alternated, as usual to reciprocating and double-acting steam-engines.

In Figs. 1, 3, 21, and 24 the position of the main valve is shown in position transversely to the axis of the main steam-cylinder; and in Figs. 12, 13, 14, and 15, where the position of the main valve is in position perpendicular to the axis of the main steam-cylinder, it is seen that the main valve and chamber are shortened for the perpendicular position, but the character of the partition, ports, and passages is the same, except that the passages lead to the main steam-cylinder in line with the motion or axis of the main valve; the operation of the main valve in both positions differs only in the direction of their sliding motion.

In Figs. 1, 3, and 6 is shown a cavity formed in this case at one end of the steam-cylinder A beyond the inserted cylinder-head U. The elongated portion of the piston B plays in the cavity with freedom of space except in its contact with the inserted cylinder-head U and that surface of the elongated portion of the piston which forms the auxiliary valve-face. This face is kept in perfect contact with the corresponding face by the loose block V seated in the inserted cylinder-head and pressed against the piston-rod by the screw W. Two return-passages are made in this elongation to insure the function of an auxiliary valve having a stroke equal to that of the main piston. In Figs. 6 and 26 the letters Y indicate a small steam-passage terminating in the face of the main piston, and originating at a point on the periphery of the main steam-piston B that comes in relation with the main steam-passages, and remains in such relation to take steam from the main steam-passages, while the piston B covers them, in sufficient quantity to more completely arrest and initiate the reverse movement of the piston until the main steam-passage is uncovered for more adequate supply. In Figs. 12, 13, 14, 17, and 19, B represents a main steam-piston with a cove turned out of its circumference to fit between the ledges of a seat formed on a separate elongated segment, which is turned up to agree with the circumference of the piston and work with the piston, with the ends playing in cavities provided in the structure to reach beyond each end of the cylinder, and have formed in the surface of the return-passages P and P', for the purposes and to be operated as hereinbefore described.

Fig. 21 is a vertical section, and Figs. 22 and 26 elevations of a double-acting steam-engine and single-acting plunger-pump. The steam-piston B has a central portion extending through the thickened bottom of the steam-cylinder and glands into the pump-chamber F formed in casting a single piece. The return-passages N and N' are formed in the plunger to communicate with the passages O and O', and passing through the thickened bottom of the cylinder, and thus perform the additional office of an auxiliary valve operated in a similar manner as hereinbefore described.

Fig. 1 shows in vertical section a double-acting steam-engine and double-acting plunger-pump. The steam-cylinder A and the bottom or most remote end of the pump-chamber I are connected in one casting with space between to attach the movable end of the pump chamber F, which is fitted for stuffer-cap and gland about the plunger H, where the two parts I and F attach with bolts, and form the entire pump-chamber. A branch pipe, for water-way Q, is flanged, as shown at R, to match corresponding flange R', formed on the frame or water-valve box-seat. The flanges R and R' are bolted together, with a thin gasket of gum intervening. The bolts pass through slots formed in the flanges, in order to compensate for different levels that come from different conditions of the packing about the plunger. The water-way Q is continued through the flanged pipes to the valve-box G. The water-way Q reaches the valve-box G by the ascending channel, as shown and is customary. The steam-piston and the pump-plunger are connected by piston-rod, and operate direct in line, through the stuffers usual to such structures. In Figs. 1, 2, 4, 10, 18, 21, 22, and 27, G represents the reversible water-valve box in vertical section, attached in Fig. 1. Another view is seen in elevation, Fig. 2. Fig. 4 shows a plan view. Fig. 10 shows sectional side and end views; also, the clamping-plate T. Fig. 18 shows a side elevation of the valve-box suited for gum-valves; also the clamping-plate. Fig. 21 shows an end section as attached in place on a single-acting plunger-pump. On the elevation Fig. 22, letter c, represents the joint-surface for seating the valve-box; and Fig. 27 represents a side and cross-section of the valve-box G, as constructed for single-acting pumps suited for metal valves. It is preferable to attach the valve-box by means of bolts passing through plate T, with intervening gaskets. All these views show the suction-valves seated on one plane, with the discharge-valves seated on another plane, but in such relation that the one kind of valve, when constructed of metal, assists to guide the other in its play to and from the seat, in being operated after the customary attachment and connections usual to machines of this class have been made. In Fig. 18, letter Q represents a gum-disk valve, having two annular projections formed on its seat-face, one near its outer edge, and the other near about the stem orifice, for the purpose of more advantageously seating by the amount of compression the projections undergo when operated to pass fluids. In Figs. 1 and 21, letter X represents a gum-cushion or buffer, filling flush with the joint-surface of the sole or base plate, to receive the cushion and be covered with a metallic sheet, and be held in place in making the end joint for the protection of the gum from injurious usages usual to the operation of such machinery.

We do not claim all the parts hereinbefore described and illustrated; but—

We claim—

1. The twin-throttle valve-case D, with the two valves, $a$ and $a'$, arranged to operate from opposite ends, and with the joint-surface and bolt-holes, all constructed substantially as described and shown.

2. In combination with the twin-throttle valve D, the main valve E, and the valve-lever S, all substantially as shown and described.

3. The main steam-valve E, with separated steam or feed passages J and J', and separated exhaust-passages L and L', when constructed and operated transversely or perpendicularly to the axis of the main steam-cylinder, as shown and described.

4. The main steam-piston B, having a segmental elongation, wherein is formed passages or channels to relate with passages leading to the main exhaust, substantially as shown and described.

5. The combination of the main steam-valve E, the main steam-piston B, and water-ram H, and the auxiliary steam-passage Y, formed in the main steam-piston, substantially as shown and specified.

6. The auxiliary steam-valve, formed together with the main steam-piston B, or attached thereto, working within an extended cavity of the main steam-cylinder with a stroke equal to the main piston, substantially as shown and specified.

7. The steam-piston B, and the water-ram extended therefrom, provided with the passages or channels N and N', substantially as shown and specified.

8. The movable pump-chamber end, attachable in a manner to serve for stuffer-gland to pack about the plunger, and form the entire chamber, provided with a branch pipe, flanged to match connecting-flange, and form a compensating or slip joint, to connect and continue the water-passage, all constructed and arranged for operation substantially as described.

9. The reversible water-valve box G, consisting of the valve-box proper, with suitable cavities, openings, and joint-surfaces, and the clamping-plate T, all substantially as shown and specified.

10. The rubber-disk valve Q, formed with two or more annular projections on its face, in combination with a conical spring, seated within a circular ledge, formed on the back or opposite face of the valve, substantially as shown and described.

JAMES R. MAXWELL.

Witnesses:
EZRA COPE.
JOHN C. MORRIS,
J. R. PADDOCK.